United States Patent
Hannen et al.

(10) Patent No.: US 10,974,857 B2
(45) Date of Patent: Apr. 13, 2021

(54) METHOD FOR CREATING AT LEAST ONE OPENING IN SHEATH MADE OF STRETCH FILM THAT RETAINS GOODS STACK ARRANGED ON PALLET, AND SHAPING APPARATUS FOR CARRYING OUT THE METHOD

(71) Applicant: MSK—Verpackungs-Systeme GmbH, Kleve (DE)

(72) Inventors: Reiner Hannen, Kalkar-Wissel (DE); Michael Oymann, Xanten (DE); Enrico Czok, Kleve (DE)

(73) Assignee: MSK—Verpackungs-Systeme GmbH, Kleve (DE)

( * ) Notice: Subject to any disclaimer, the term of this patent is extended or adjusted under 35 U.S.C. 154(b) by 224 days.

(21) Appl. No.: 15/936,938

(22) Filed: Mar. 27, 2018

(65) Prior Publication Data
US 2018/0282007 A1    Oct. 4, 2018

(30) Foreign Application Priority Data

Mar. 28, 2017 (EP) .................................... 17163427

(51) Int. Cl.
*B65B 47/02* (2006.01)
*B65B 47/04* (2006.01)
(Continued)

(52) U.S. Cl.
CPC .............. *B65B 47/02* (2013.01); *B65B 9/135* (2013.01); *B65B 47/04* (2013.01); *B65B 53/02* (2013.01);
(Continued)

(58) Field of Classification Search
CPC ......... B65B 47/02; B65B 47/04; B65B 59/00; B65B 59/001; B65B 9/135; B65B 7/162;
(Continued)

(56) References Cited

U.S. PATENT DOCUMENTS 3,522,688 A * 8/1970 Kaliwoda .............. B65D 53/06
                                                          53/442
3,621,588 A    11/1971 Grocke
(Continued)

FOREIGN PATENT DOCUMENTS

CN          1339003 A      3/2002
CN       200960983 Y      10/2007
(Continued)

*Primary Examiner* — Robert F Long
*Assistant Examiner* — Eduardo R Ferrero
(74) *Attorney, Agent, or Firm* — Berenato & White, LLC

(57) ABSTRACT

A method for creating an opening in a sheath, made of stretch film, that retains a goods stack arranged on a pallet. The pallet comprising an upper-side deck surface as support for the goods stack and lower-side support feet. The sheath engages under the support feet arranged in the region of the four outer edges of the pallet. At least one opening is in the sheath between two support feet. At least one opening is generated such that the sheath is first heated, the heated sheath is retracted from the pallet and then, still in the heated state, displaced upward. The upwardly displaced sheath is secured in its upwardly displaced position by cooling. The invention also relates to a shaping apparatus, and additionally to at least one heating device for carrying out the method.

26 Claims, 13 Drawing Sheets

(51) Int. Cl.
  *B65B 53/02* (2006.01)
  *B65B 9/13* (2006.01)
  *B65D 71/00* (2006.01)
  *B65B 59/00* (2006.01)
  *B29C 61/02* (2006.01)

(52) U.S. Cl.
  CPC ............. *B29C 61/02* (2013.01); *B65B 59/001* (2019.05); *B65D 71/0088* (2013.01); *B65D 71/0096* (2013.01); *B65D 2571/00006* (2013.01); *B65D 2571/00012* (2013.01); *B65D 2571/00018* (2013.01)

(58) Field of Classification Search
  CPC .. B65B 9/13; B65B 9/14; B65B 61/00; B65B 61/02; B65B 53/02; B65D 75/006; B65D 85/62; B65D 2571/00006; B65D 2571/00012; B65D 2571/00018; B65D 2571/0003; B65D 71/0088; B65D 71/0092; B65D 71/0096
  USPC .......................................................... 53/442
  See application file for complete search history.

(56) References Cited

U.S. PATENT DOCUMENTS

| | | | | |
|---|---|---|---|---|
| 3,626,654 A | * | 12/1971 | Hoffler | B65B 53/066 53/397 |
| 3,807,126 A | * | 4/1974 | Schwarz | B65B 53/06 53/442 |
| 3,858,526 A | * | 1/1975 | Lombard | B65D 71/0096 206/386 |
| 3,903,673 A | * | 9/1975 | Grasvoll | B65D 71/00 53/535 |
| 3,997,054 A | * | 12/1976 | Berghgracht | B65B 53/02 206/598 |
| 4,546,593 A | * | 10/1985 | Lasscock | B65B 53/02 414/788.9 |
| 4,829,744 A | * | 5/1989 | Kapke | B65B 11/025 53/138.1 |
| 5,184,449 A | * | 2/1993 | Hannen | B65B 11/025 53/399 |
| 5,216,871 A | * | 6/1993 | Hannen | B65B 11/025 53/399 |
| 5,596,866 A | | 1/1997 | Martin-Cocher et al. | |
| 5,720,153 A | * | 2/1998 | Martin-Cocher | B65B 9/135 206/598 |
| 6,012,266 A | * | 1/2000 | Koskinen | B65B 1/26 53/399 |
| 6,029,423 A | * | 2/2000 | Bartels | B29C 57/10 53/370.9 |
| 6,298,636 B1 | * | 10/2001 | Lachenmeier | B65B 9/135 53/442 |
| 6,421,983 B1 | * | 7/2002 | Lachenmeier | B65B 53/066 53/442 |
| 7,703,263 B2 | * | 4/2010 | Reiner | B65B 59/00 53/442 |
| 2002/0170270 A1 | * | 11/2002 | Borchard | B65B 9/135 53/432 |
| 2007/0220830 A1 | * | 9/2007 | Macleod | B65B 9/135 53/441 |
| 2008/0209862 A1 | * | 9/2008 | Jappi | B65B 11/00 53/449 |
| 2009/0016867 A1 | * | 1/2009 | Hojholt | B65D 71/0088 414/787 |
| 2009/0288980 A1 | * | 11/2009 | Hadala | B65D 71/0096 206/597 |
| 2017/0081063 A1 | | 3/2017 | Hannen et al. | |

FOREIGN PATENT DOCUMENTS

| | | |
|---|---|---|
| CN | 101296847 A | 10/2008 |
| DE | 6801652 U | 1/1969 |
| DE | 2331861 A1 | 1/1975 |
| DE | 9001052 U1 | 4/1990 |
| DE | 4404599 A1 | 8/1995 |
| EP | 0601222 A1 | 6/1994 |
| EP | 0697337 A1 | 2/1996 |

\* cited by examiner

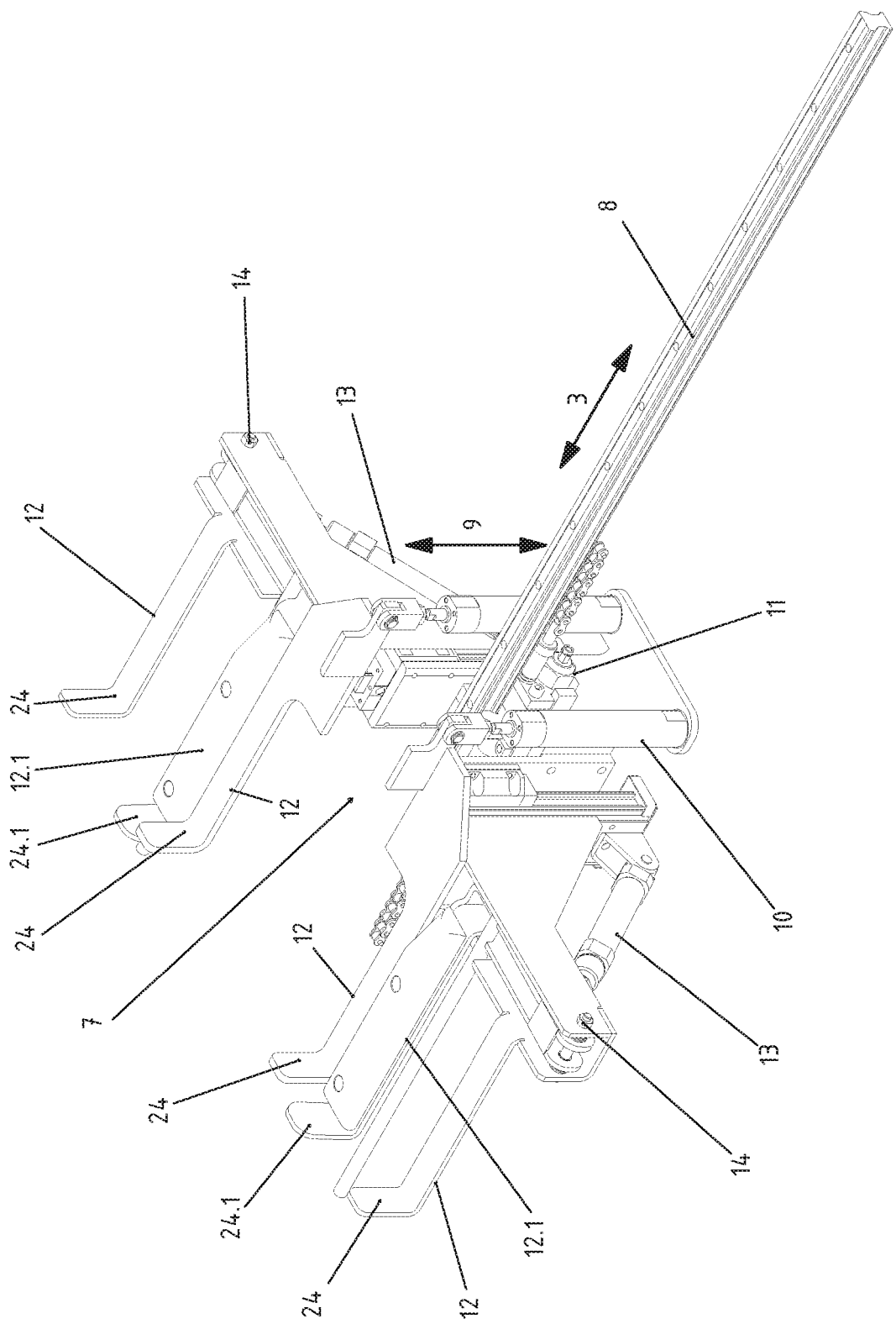

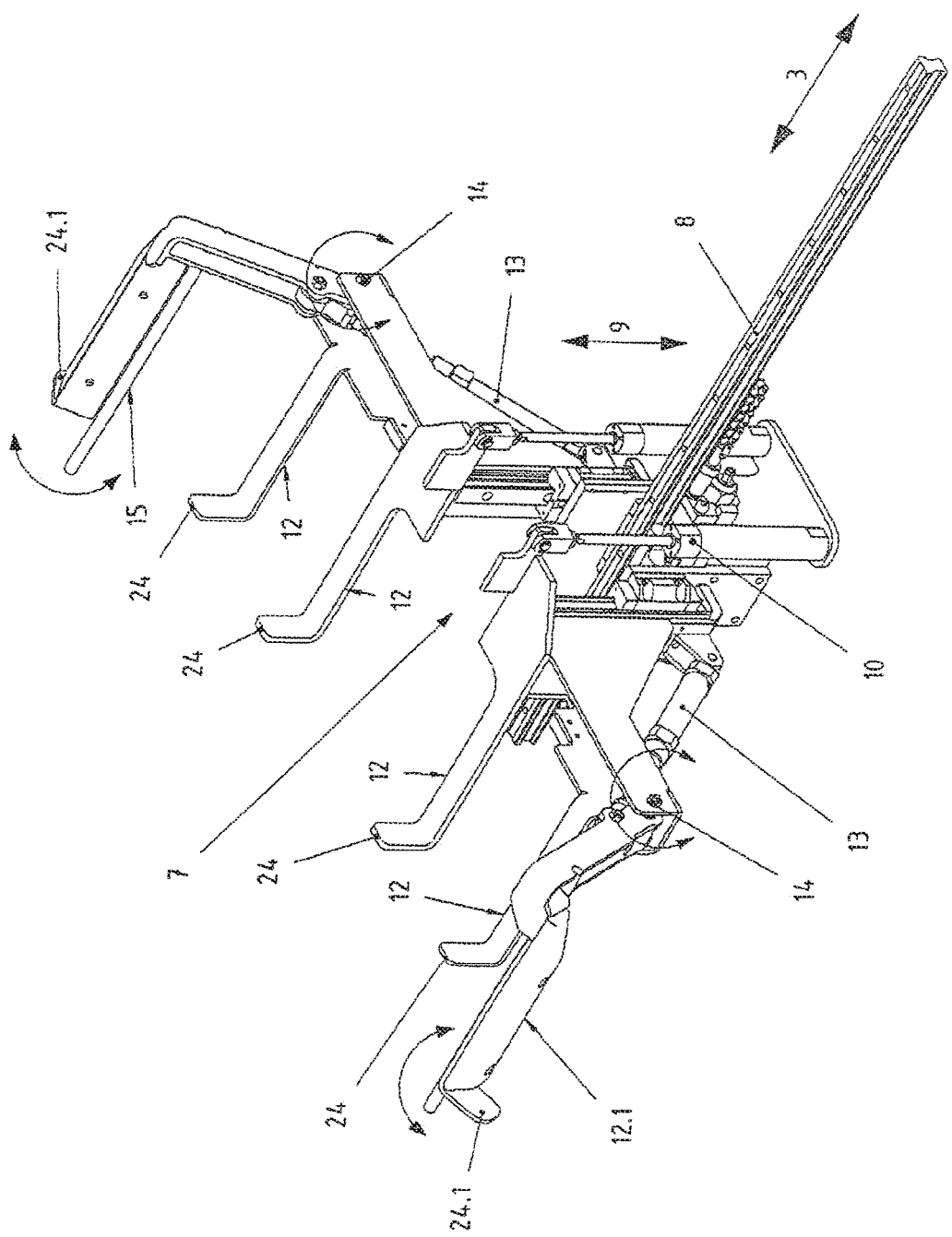

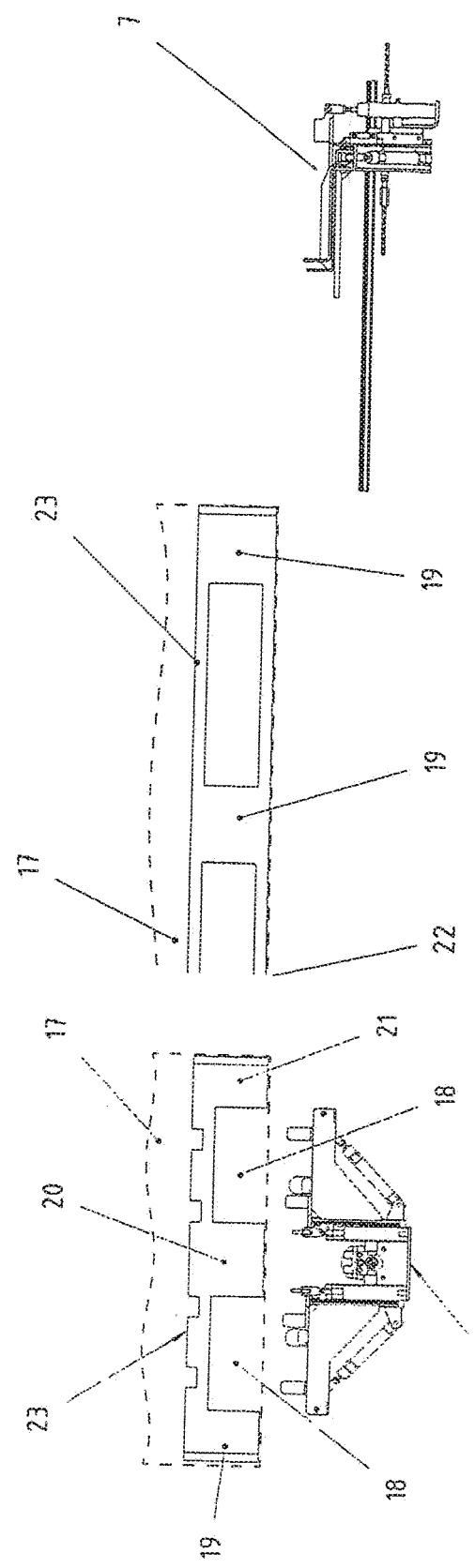

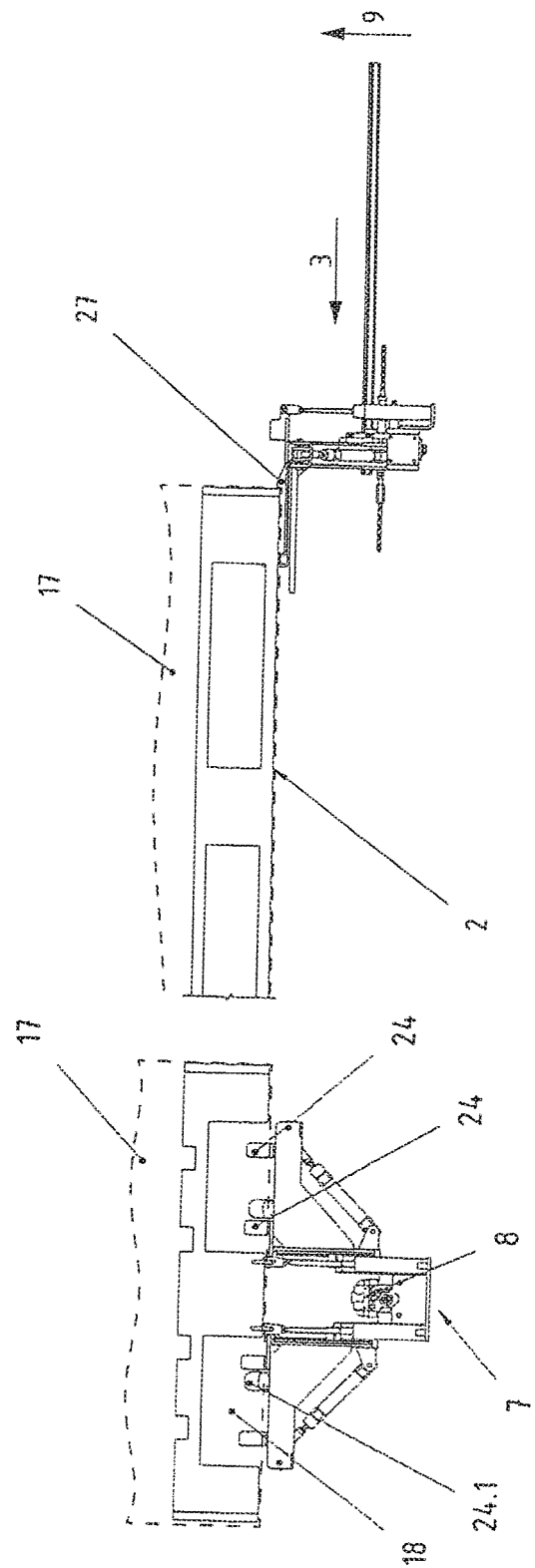

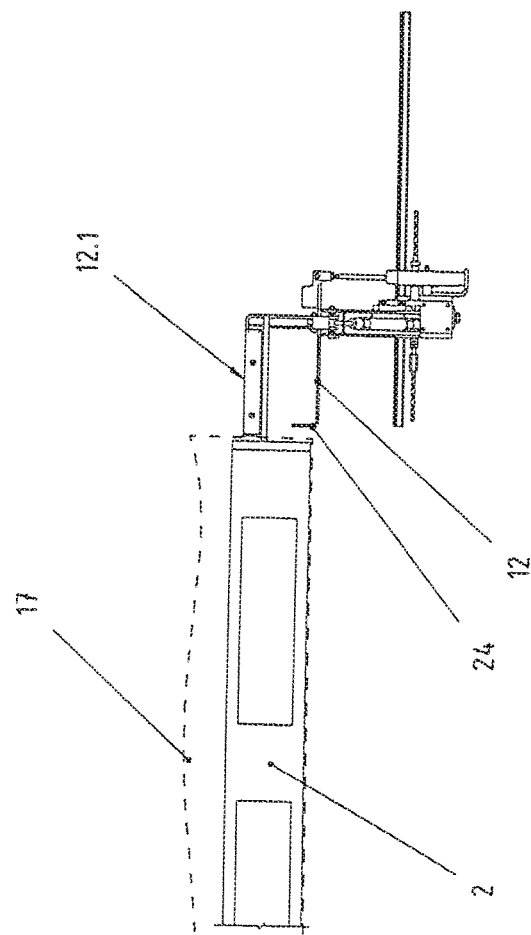
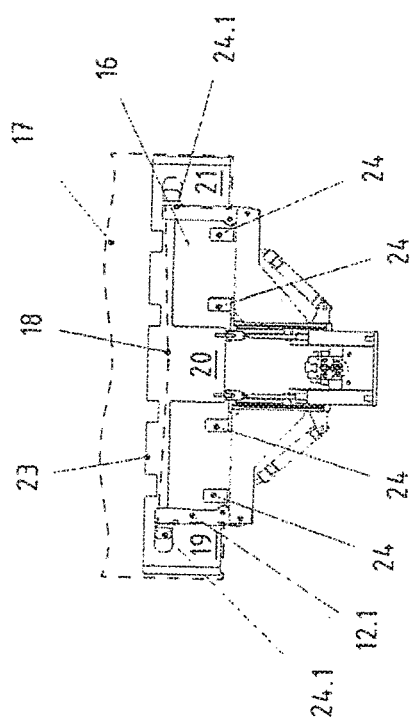
Fig. 12A
Fig. 12B

METHOD FOR CREATING AT LEAST ONE OPENING IN SHEATH MADE OF STRETCH FILM THAT RETAINS GOODS STACK ARRANGED ON PALLET, AND SHAPING APPARATUS FOR CARRYING OUT THE METHOD

CROSS-REFERENCE TO RELATED APPLICATIONS AND CLAIM TO PRIORITY

This application is related to Patent Application No. 17163427.2 filed Mar. 28, 2017 in the European Patent Office, the disclosure of which is incorporated herein by reference and to which priority is claimed.

FIELD OF THE INVENTION

The invention relates to a method for creating at least one opening in a sheath, made of stretch film, that retains a goods stack arranged on a pallet, the pallet comprising an upperside deck surface as support for the goods stack and several lower-side support feet arranged at a distance from one another and forming foot openings, and the sheath engaging at least partly under the lower side of the support feet arranged in the region of the four outer edges of the pallet, and at least one opening being introduced into the sheath region located between two support feet that are arranged in a row having at least two support feet.

BACKGROUND OF THE INVENTION

A "stretch film" is understood hereinafter as an extensible film in the form of a tube. This stretch film can have been cut to length, for example, from a folded-together gusseted tube. The stretch film is then, for example, stretched as viewed in a circumferential direction by means of a gathering device so that the circumference is enlarged, and then, for example using a pull-over device, pulled by way of a vertical motion, usually from top to bottom, over a goods stack arranged on a pallet. The stretch film is pulled off from the pull-over device and, because of its return forces, abuts tightly against the outer side of the goods stack and the pallet. The stretch film is sometimes also referred to as a "banderole."

With a Euro pallet, a total of three rows each having three block-like support feet are provided, the three support feet of a row being connected to one another on the lower side by a runner board. With this configuration, the sheath engages under the lower side of the two outermost runner boards. The deck surface is usually made up of five deckboards. Transverse boards can also be arranged between the support feet and the deck surface.

The stretching process is a load-retaining process for retaining a goods stack arranged on a pallet. The stretch film is firstly stretched in order to be pulled over, and is then, in the stretched state, pulled from above over the goods stack arranged on the pallet. As a result, the goods stack is encased on its four sides and, if a stretch hood is involved, also on the upper side. In conjunction with a bottom sheet, protection of the goods stack on all sides is also possible.

For transport using industrial trucks, for example a fork lift, openings must be introduced in the lower region in order to pick up the pallet. These openings are usually produced by punching the fork tips into the sheath. A disadvantage is that the foot openings are not entirely free of the sheath. The pallet is therefore often not accepted by automated high-bay warehouses, since the obligatory placeability test of the foot openings between the support feet has a negative result. An attempt has also been made to remove the stretch film completely in the region of the pallet, in the region of that side of the pallet into which the fork tips of a fork life are to be introduced. The result is that the foot openings are completely open, but this has a considerable negative effect on load stability.

SUMMARY OF THE INVENTION

An object of the invention is to avoid the aforementioned disadvantages and to describe a method with which a foot opening or foot openings between the support feet of a pallet can be rendered completely free of the sheath without thereby diminishing load stability and the protective effect of the sheath.

This object is achieved in that at least one opening is generated in such a way that the sheath region is firstly heated; that then the heated sheath region is retracted from the pallet and then, still in the heated state, displaced upward, the upwardly displaced sheath region then being secured in its upwardly displaced position by cooling. The stretch film is embodied in terms of its material properties in such a way that it can be softened and thus pulled by warming. As the heat dissipates, the stretch film cools off again. The sheath region is heated and retracted only on that side of the goods stack on which an opening is to be generated. The stretch film is not damaged, i.e. for example torn or cut, as a result of the method according to the present invention. Once the sheath region has cooled sufficiently, it remains in that position. The relevant foot opening is consequently entirely free of the sheath region, since the sheath region has been "laid around" the relevant foot opening.

The foot openings can thus be reliably exposed using the method according to the present invention. The method according to the present invention can easily be integrated into the existing stretching process, and permits the production of a durable sheath. The method can be used for all pallet types and positions, and load stability can be established as desired.

At the beginning of the retraction of the sheath region away from the pallet, the sheath region can be merely preheated so that further heat application occurs as retraction continues. "Preheating" is understood as that state of the sheath region in which the sheath region is at least deformable, so that the sheath region can be elongated to the extent necessary in order to achieve the desired retraction and upward displacement with no damage to, i.e. tearing of, the sheath region.

It is also, however, entirely possible for the heated sheath region to be retracted from the pallet only when heating of the sheath region is entirely completed. In this case the consistency of the sheath region which results from heating is such that the sheath region on the one hand can be elongated to the extent necessary in order to achieve the desired retraction and upward displacement with no damage to, i.e. tearing of, the sheath region. On the other hand, the sheath region that is in its upwardly displaced position can, upon cooling, fuse e.g. to a support foot, to a deck surface of the pallet, or to a sub-region of the sheath laterally contiguous to the sheath region, so that good and permanent securing in its upwardly displaced position is achieved. This fusing can also be assisted by pressure on the sheath region that has not yet entirely cooled.

If the sheath region is captured between the lower side of the pallet and the substrate, for example the conveyor, the pallet can be lifted before the sheath region is heated.

The upward displacement can occur as far as the region of the deck surface of the pallet, preferably somewhat below the deck surface of the pallet.

Upon the upward displacement of the sheath region, the sheath can be pulled around the respective lower inner edge of the two support feet. The "inner edges" are understood as those edges of the two support feet which face toward one another.

The two support feet can be directly adjacent. The two support feet can also, alternatively, be the outermost support feet of a row. If three support feet are arranged in the row, the upwardly displaced sheath region would thus extend over the center support foot. With this embodiment, once the method has been carried out the center support foot is free of the sheath region both in the region of its outer side and in the region of its lower side. If the pallet has, for example, five support feet in a row, the two support feet can then also be the second and the fourth support foot.

The sheath can be secured on the lower side of the two support feet before and/or after the sheath region is retracted from the pallet, and/or before and/or after the upward displacement of the sheath region.

The retraction and/or upward displacement of the sheath region away from the pallet can occur in such a way that the sheath still remains secured on the lower side of the two support feet.

If the stretch film is embodied as a tube both of whose ends are therefore open, the sheath pulled over the goods stack is then not closed in the region of the upper side of the goods stack. With such a configuration, the stretch film is pulled over the goods stack in such a way that in the pulled-over state, the stretch film projects with a peripheral edge region with respect to the upper side of the goods stack. Because of return forces, however, the peripheral edge region projecting with respect to the upper edge of the goods stack immediately folds down as it is pulled over, and abuts against the upper side of the goods stack in order to achieve good load security.

A stretch hood or tension hood can also be used as a sheath. In contrast to a configuration open at both ends, with a hood-shaped configuration of the stretch film the goods stack is also completely enclosed on the upper side.

It is sensible if, during retraction and/or upward displacement of the sheath region, at least a sub-region of the sheath is at least temporarily secured with respect to the pallet from outside in a horizontal direction, preferably by pressure application, at least in at least one region close to a foot opening above the sheath region. Undesired "half-moon" formation in the region of the side shaped by means of the method according to the present invention is thereby avoided.

At least the upwardly displaced sheath region that is still in the heated state can be displaced back toward the pallet before cooling. The sheath region is thereby displaced back closer to the pallet and can thus attach to the sheath placed on the lower side around the two support feet enclosing the opening(s) before the sheath region and the sheath harden due to cooling. This displacement toward the pallet can be accomplished, for example, by means of a suitable device which for that purpose is actively moved toward the pallet. A displacement can also be accomplished, however, by a recovery as a consequence of a weakening tensile force that has been applied, for example, for the initial retraction of the sheath region, still in the heated state, from the pallet.

The displacement back toward the pallet at least of the upwardly displaced sheath region that is still in the heated state can furthermore occur, before cooling, sufficiently far toward the pallet that the stretched-out sheath region and/or the respective sub-regions of the sheath laterally contiguous to the sheath region is/are at least somewhat pressed on the rear side against at least one support foot and/or against the deck surface of the pallet. With such a procedure, when the stretched-out sheath region is pressed directly against the pallet, the sheath region adhesively bonds to the pallet in the contact region after hardening.

As a result of the displacement of the stretched-out sheath region back toward the pallet, that sub-region of the sheath which is laterally contiguous to the sheath region can fold over into a kind of crease that is located between the stretched-out sheath region and the pallet and faces toward the opening that is to be created. After pressure application the rear-side half of the crease is in direct contact with the support foot and/or with the deck surface of the pallet, while the other half of the crease is in contact with the rear-side half of the crease and with the stretched-out sheath region displaced toward the pallet.

The pressure application produces good adhesive bonding of the sheath region and/or of that sub-region of the sheath which is contiguous to the sheath region, so that the upwardly displaced sheath region, stretched out like a soccer goal and hardened, is reliably and permanently secured to the support foot or support feet and/or to the deck surface and/or to that sub-region of the sheath which is laterally contiguous to the sheath region. Additional stabilization is thus achieved by way of the pressure application.

It is sensible if the heated sheath region is cooled, preferably by means of an air stream, after completion of the upward displacement. A fan, a nozzle, or compressed air can be used, for example, for cooling. Solidification of the sheath region "laid around" the foot opening or foot openings is thereby accelerated.

The invention also relates to a shaping apparatus for carrying out a method for creating at least one opening in a sheath, made of stretch film, that retains a goods stack on a pallet, the pallet comprising an upper-side deck surface as support for the goods stack and several lower-side support feet arranged at a distance from one another and forming foot openings, and the sheath engaging at least partly under the lower side of the support feet arranged in the region of the four outer edges of the pallet, and at least one opening being introduced into the sheath region located between two support feet that are arranged in a row having at least two support feet.

A "stretch film" is understood hereinafter as a extensible film in the form of a tube. This stretch film can have been cut to length, for example, from a folded-together gusseted tube. The stretch film is then, for example, stretched as viewed in a circumferential direction by means of a gathering device so that the circumference is enlarged, and then, for example using a pull-over device, is pulled by way of a vertical motion, usually from top to bottom, over a goods stack arranged on a pallet. The stretch film is pulled off from the pull-over device and, because of its return forces, abuts tightly against the outer side of the goods stack and the pallet. The stretch film is sometimes also referred to as a "banderole."

With a Euro pallet, a total of three rows each having three block-like support feet are provided, the three support feet of a row being connected to one another on the lower side by a runner board. With this configuration, the sheath engages under the lower side of the two outermost close-out boards. The deck surface is usually made up of five deckboards. Transverse boards can also be arranged between the support feet and the deck surface.

The stretching process is a load-retaining process for retaining a goods stack arranged on a pallet. The stretch film is firstly stretched in order to be pulled over, and then, in the stretched state, pulled from above over the goods stack arranged on the pallet. As a result, the goods stack is encased on its four sides and, if a stretch hood is involved, also on the upper side. In conjunction with a bottom sheet, protection of the goods stack on all sides is also possible.

For transport using industrial trucks, for example a fork lift, openings must be introduced in the lower region in order to pick up the pallet. These openings are usually produced by punching the fork tips into the sheath. A disadvantage is that the foot openings are not entirely free of the sheath. The pallet is therefore often not accepted by automated high-bay warehouses, since the obligatory placeability test of the foot openings between the support feet has a negative result. An attempt has also been made to remove the stretch film completely in the region of the pallet, in the region of that side of the pallet into which the fork tips of a fork life are to be introduced. The result is that the foot openings are completely open, but this has a considerable negative effect on load stability.

An object of the invention is to avoid the aforementioned disadvantages and to describe an apparatus allowing a foot opening or foot openings between the support feet of a pallet to be rendered completely free of the sheath without thereby diminishing load stability and the protective effect of the sheath.

This object is achieved in that in order to carry out the method according to one of claims 1 to 13, at least two shaping fingers are provided which are displaceable in a vertical direction for upward displacement of the sheath region and are preferably also displaceable in a horizontal direction for, preferably prior, retraction of the sheath region away from the pallet; and that in addition to the shaping apparatus, at least one, preferably electrically operated, heating device is provided for prior heating of the sheath region to be displaced.

Firstly, the relevant sheath region can be heated by means of each heating device. Using the shaping apparatus, the heated sheath region is then firstly retracted outward from the pallet and then displaced upward by a vertical movement of the shaping fingers. The sheath region is thereby stretched out like a soccer goal. The sheath region maintains that shape after cooling, so that the corresponding foot opening or foot openings is/are permanently freely accessible. In the context of the upward displacement of the sheath region, the sheath is preferably pulled around the respective lower inner edge of each of the two support feet so that as a result, the stretch film remains in the two regions of the sheath laterally contiguous to the upwardly displaced sheath region, and load security is thereby produced.

The two support feet can be, for example, directly adjacent support feet, so that a foot opening is then freely accessible. If the two support feet are the outermost support feet of a row, at least two foot openings as well as the end face and the lower side of the support foot or support feet located therebetween are freely accessible. The sheath can be secured on the lower side of the two support feet before and/or after retraction of the sheath region away from the pallet and/or before and/or after the upward displacement of the sheath region, or alternatively the retraction and/or the upward displacement of the sheath region away from the pallet can be accomplished in such a way that the sheath still remains secured to the lower side of the two support feet.

The vertical displacement can be an exclusively vertical displacement. The relevant shaping fingers can of course also simultaneously be displaced horizontally in the context of the vertical displacement, for example in the context of a pivoting movement.

The shaping apparatus according to the present invention represents a supplement to the known stretching system for complete pallets to include automated shaping of a foot opening or foot openings of a pallet in order to ensure placeability for automated storage facilities, in particular high-bay warehouses. The shaping apparatus can also be integrated into a stretching facility.

Thanks to the compact design, the shaping apparatus according to the present invention can easily be integrated into an already existing stretching process, or an already existing stretching facility can be supplemented with a shaping apparatus and a heating device. The shaping apparatus and heating device according to the present invention are notable for considerable variability. They are suitable for different pallet formats, for example Euro Pool pallets, "industrial" (EUR2) pallets, or "Düsseldorf" (EUR6) pallets. If the shaping apparatus and the heating device are integrated into a stretching unit, then during down times and during the stretching process or elongation process they are preferably located outside the travel paths of the components that effect stretching or elongation and pull-over.

At least one heating device can encompass at least two heating surfaces oriented at an angle, preferably a right angle, to one another, the one heating surface applying heat to the sheath in the region of the relevant outer surface of the pallet, and the other heating surface applying heat to the sheath in the edge region, contiguous to the outer surface, of the lower side of the pallet.

At least one heating device can be displaceable, preferably by pivoting, between a heating position and a parked position.

At least two heating devices facing toward one another are preferably provided, the distance between the two heating devices being at least somewhat greater than the distance between the two oppositely located outer surfaces of the pallet into which at least one opening is respectively to be introduced. The heating devices can be displaceable separately or synchronously. The "distance" between the two heating devices is understood as the distance between those points on the two heating devices which are located closest to one another.

The distance between the heating devices can be modifiable. For this, for example, at least one heating device can have a pneumatic or electrical drive system associated with it. The heating devices can thereby be adapted to different pallet formats.

Each heating device can be arranged on a holding arm, and the holding arms can be connected to one another via a connecting element. The two holding arms and the connecting element form an approximately U-shaped frame. If the heating devices are pivotable, it is sensible if the connecting element is mounted rotatably around its longitudinal axis. A drive system for pivoting can be associated with the connecting element.

It is sensible if at least one shaping finger is mounted pivotably around a pivot shaft oriented parallel to the horizontal travel path so that for shaping, that shaping finger is pivotable upward and outward by means of a drive system. The shaping apparatus preferably comprises two shaping fingers, each mounted pivotably around a pivot shaft oriented parallel to the horizontal travel path. In their idle position the shaping fingers point toward one another, and for shaping they are pivoted outward away from one another. The sheath region is thus displaced upward and thereby stretched out like a soccer goal, while the sheath in the two regions laterally contiguous to the sheath region is still in its original position and thus still engages under the lower side of the pallet. The corresponding foot opening or foot openings is/are therefore freely accessible. At least one shaping finger pivotably mounted around a pivot shaft oriented parallel to the horizontal travel path is preferably oriented with reference to the pallet in such a way that upon pivoting, the shaping finger is at a distance from the outer side of the pallet and thus cannot come into contact with the pallet.

The shaping apparatus can additionally comprise at least two shaping fingers that are displaceable in a horizontal direction away from the pallet in order to retract the sheath region away from the pallet. With such a configuration, these shaping fingers serve only to retract the sheath region, while the shaping fingers pivotably mounted respectively around a pivot shaft oriented parallel to the horizontal travel path produce the upward displacement of the sheath region.

At least one pivotably mounted shaping finger can be embodied and/or arranged, with respect to the shaping finger(s) that is/are associated with that pivotably mounted shaping finger, in such a way that upon retraction, that pivotably mounted shaping finger is not in contact with the sheath region. The pulled-out sheath region can thereby be reliably taken up by the pivotably mounted shaping fingers.

The shaping apparatus can comprise a guide and a drive system for a horizontal displacement, and/or the shaping apparatus can comprise a vertical guide and a drive system for a vertical displacement.

In order to grasp the sheath, the end of at least one shaping finger can be embodied as a tab and/or as a hook. The hook can be, for example, a bend, provided at the end of the relevant shaping finger, that projects from below into the sheath. The sheath region can be retracted outward away from the pallet using the tabs or hooks. That side or surface of a tab or hook which faces toward the pallet can also be used as a pressure application surface. When the shaping apparatus, in the subsequent stretched-out state, is again displaced horizontally toward that side of the pallet which is oriented orthogonally to the conveying direction of the pallet, the shaping fingers, with their surface facing toward the pallet, press the as-yet uncooled double-ply sheath against the deck surface or the outer side of the support foot of the pallet. As a result, the stretched-out sheath region and the contiguous sheath are again displaced closer to the pallet and, upon cooling, attach themselves to the sheath placed around the support foot before it cools, so that additional stabilization is thereby achieved thanks to the attachment of the sheath region to the contiguous sheath and/or the pallet.

For at least one shaping finger, at least one, preferably each, region coming into contact with the sheath and/or with the sheath region is coated and/or fitted with an anti-adhesion material and/or heat-resistant material. When an anti-adhesion material is used, friction between the shaping finger and the sheath is reduced so that the sheath is not damaged. The use of an anti-adhesion material also prevents adhesive bonding of the hot sheath to the surfaces of the shaping fingers. The surface energy at the shaping finger in relation to the hot sheath is thus minimized by anti-adhesion materials, so that surface wetting and adhesive bonding are avoided. Because the shaping apparatus in its idle position is located outside the heating region, heating of the shaping apparatus, in particular of the shaping fingers, is reduced as much as possible so that surface energy and adhesion susceptibility are likewise thereby minimized. The use of a heat-resistant material is sensible because the sheath is still in the heated state upon execution of the method.

The shaping apparatus interacting with one side of a pallet can be made up of two halves, each half comprising at least one respective pivotable shaping finger and optionally also at least one shaping finger, and each half preferably being constructed in mirror-image fashion, and the two halves preferably being displaceable synchronously. Such a configuration is sensible, for example, for a pallet having three rows of support feet; in such a case the conveyor, which can also be, for example, a pull-over unit conveyor, usually also comprises three travel tracks adapted to the rows of support feet of the pallets. A pull-over unit conveyor is usually located in a stretching facility. In a stretching facility, tubular stretch films or stretch-film hoods can be pulled over. A travel track can be, for example, a chain track, a belt track, or the like. The one half of the shaping apparatus creates an opening in the left foot opening, and the other half of the shaping apparatus creates an opening in the right foot opening. The sheath region is thus "laid around" the sheath region and, after cooling, solidifies in the stretched-out position. The pallet is consequently free both in the region of the two foot openings and also at the end in the region of the center row of support feet.

At least one shaping finger can have associated with it a stop that delimits the pivot travel of that shaping finger and extends, parallel to the horizontal travel path in an oppositely facing direction, projectingly beyond the shaping finger(s) associated with that shaping finger. The stop thus projects into the contour of the pallet, i.e. into the foot opening, during the pivoting movement. When the stop comes into contact, for example, with the support foot of the foot opening upon pivoting of the shaping finger, the pivoting movement is stopped.

An angle compensation element embodied preferably as a vertically oriented peg can be provided for adapting the orientation of the shaping apparatus with respect to the pallet. The shaping apparatus can thereby also be oriented with reference to a pallet that is not optimally arranged.

A securing element displaceable toward the pallet can be provided in order to secure the sheath with respect to the pallet, preferably in the region of that side of the sheath which is to be shaped, upon retraction and/or upon upward displacement of the sheath region.

The invention also relates to a use of a system for creating at least one opening in a sheath, made of film, that retains a goods stack arranged on a pallet, encompassing a conveyor, a pallet lifting device arranged within the contour of the conveyor and preferably comprising lifting posts, at least one shaping apparatus, and in addition to the shaping apparatus, for prior heating of the sheath region to be displaced, at least one, preferably electrically operated, heating device, the sheath being made of stretch film.

BRIEF DESCRIPTION OF THE DRAWINGS

Exemplifying embodiments of the invention depicted in the drawings will be described below. In the drawings:

FIG. 6 shows a shaping apparatus in the folded-in and non-lifted state (idle position);

FIG. 7 shows the shaping apparatus of FIG. 6 in the folded-out and lifted state;

FIG. 8A shows a front view of the shaping apparatus in the idle position;

FIG. 8B shows a side view of the shaping apparatus in the idle position;

FIG. 9A shows a front view of the shaping apparatus moving toward the pallet;

FIG. 9B shows a side view of the shaping apparatus moving toward the pallet;

FIG. 12A shows a front view of a sheath under the pressure application operation;

FIG. 12B shows a side view of the sheath under the pressure application operation;

In all the Figures, corresponding reference characters are used for identical or similar components.

DETAILED DESCRIPTION OF THE PREFERRED EMBODIMENT(S)

Figure 1:
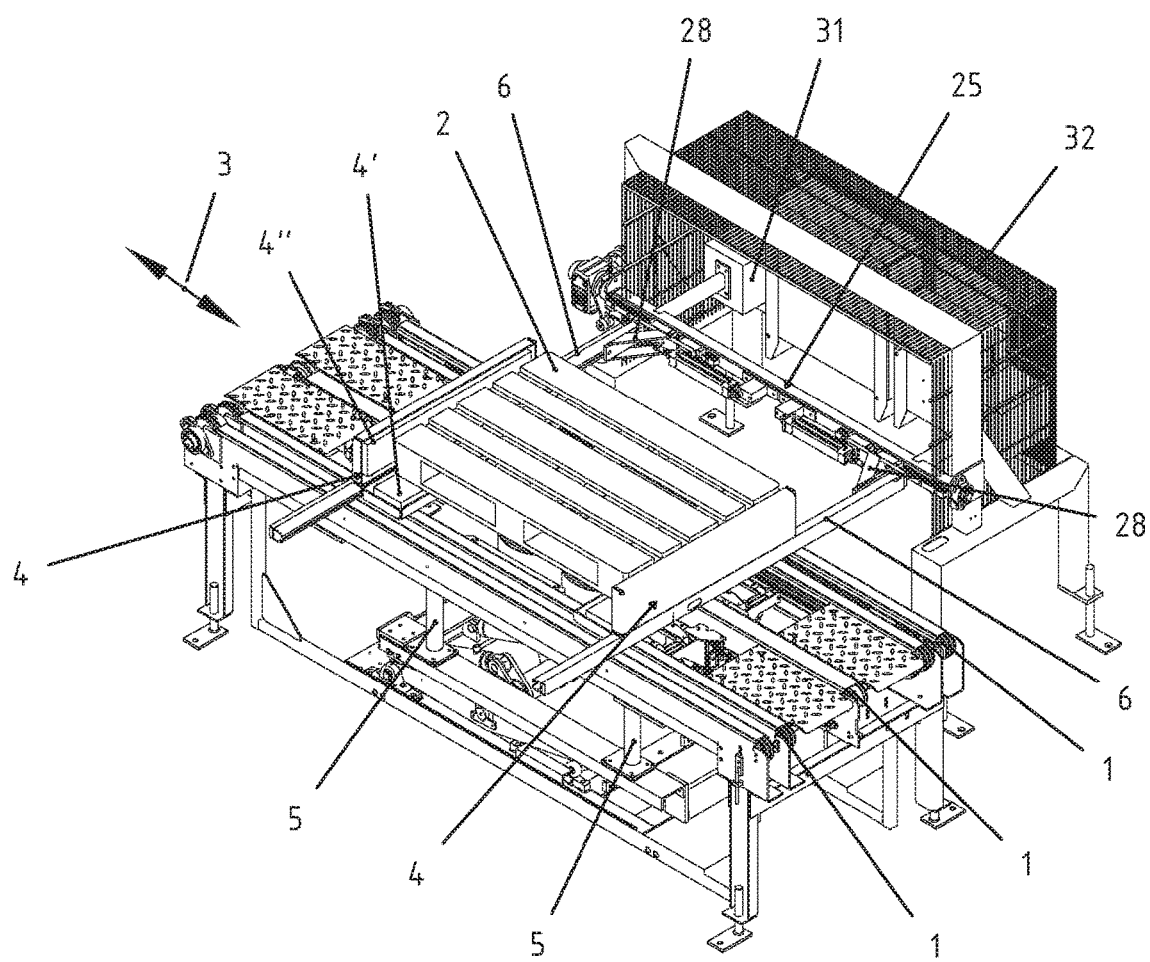
FIG. 1 is an oblique plan view of a conveyor having a total of two shaping apparatuses according to the present invention, two heating devices, and having a pallet lifting device located within the contour of the conveyor and a pallet located on the conveyor.
Figure 2:
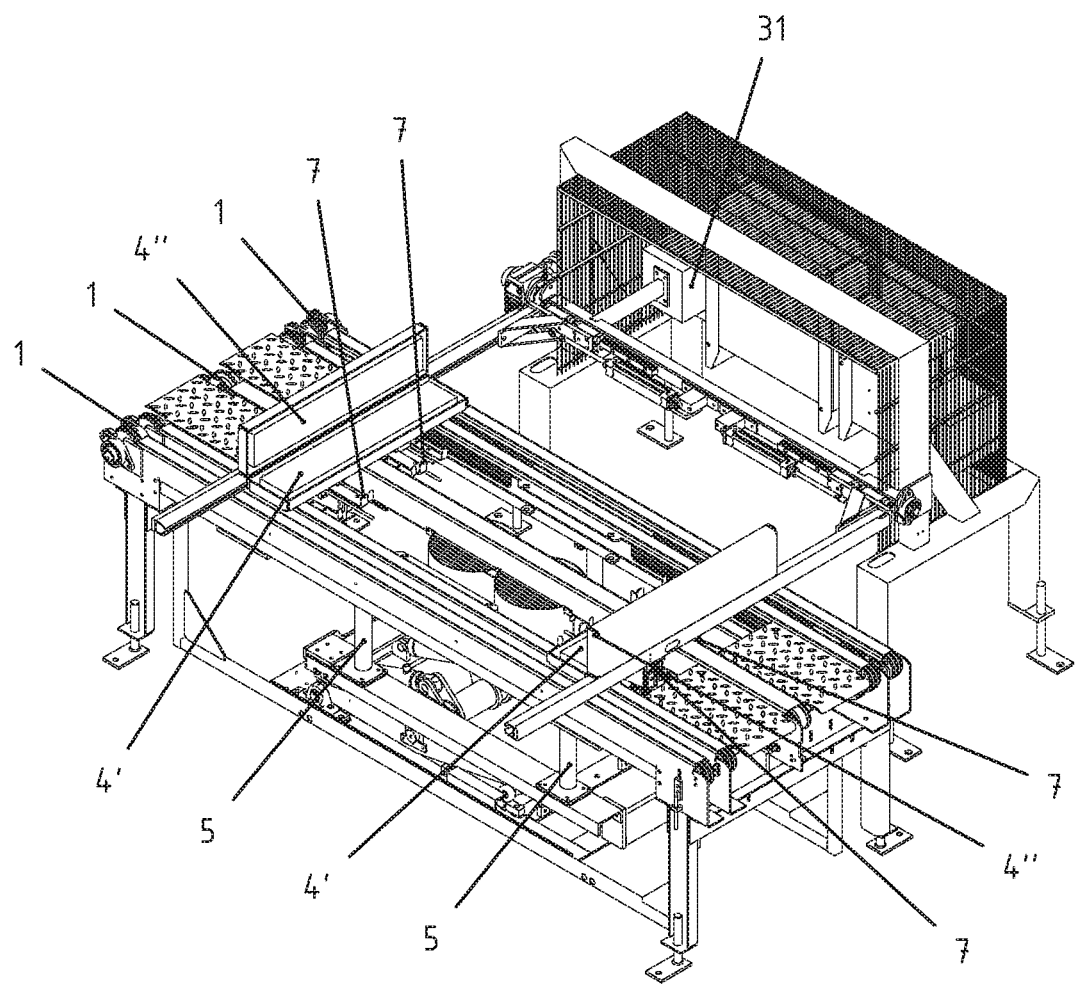
FIG. 2 shows the subject matter of FIG. 1, without a pallet.

FIG. 1 shows a conveyor that is embodied, in the exemplifying embodiment depicted, as a chain conveyor. In the exemplifying embodiment depicted, the chain conveyor encompasses five chain tracks 1. The first and second chain tracks 1, and the fourth and fifth chain tracks 1, are respectively arranged a short distance apart. The distance between adjacent chain tracks 1 is adapted for the formats of pallets 2 that are to be conveyed. By means of the chain conveyor, a pallet 2 placed thereon, on the upper side of which a goods stack (not depicted in FIG. 1) is arranged, can be moved in a conveying direction (arrow 3). Usually the two longitudinal edges of pallet 2 are oriented parallel to conveying direction 3, while the two short end edges of pallet 2 are oriented orthogonally to conveying direction 3.

Also provided is a pallet lifting device that is arranged inside the contour of the conveyor. The pallet lifting device comprises a total of four lifting posts 5. As is evident, for example, from FIG. 1, two lifting posts 5 are arranged between the second chain track 1 viewed from the left and the center chain track 1; and two lifting posts are arranged between the center chain track 1 and the second chain track 1 viewed from the right. Lifting posts 5 are vertically displaceable so that a pallet 2 standing on chain tracks 1 can be lifted and thus exposed.

The two ends of the conveyor are connected via suitable connecting points to the additional conveying technology or to other facility constituents, for example an upstream stretching unit. In the stretching unit, a sheath 17 made of stretch film is pulled over. A usual pallet 2, as depicted e.g. in FIGS. 1, 8, and 12, comprises three rows each made up of three block-like support feet 19, 20, 21, the three support feet 19 and 20 and 21 in a row being connected to one another on the lower side by a runner board 22. Sheath 17 is pulled over, by stretching, in such a way that the sheath thereby engages below the lower side of the two outermost runner boards 22 (support feet 19 and 21) and the two outer ends of runner board 22 that connects support feet 20.

As depicted in FIGS. 1 to 5, two heating devices 4, for example operated electrically, are provided. Heating devices 4 are oriented facing one another. As depicted in FIG. 1, the one heating device 4 acts on the one side of pallet 2 oriented orthogonally to conveying direction 3, and the second heating device 4 acts on the other, oppositely located, side of pallet 2 oriented orthogonally to conveying direction 3.

In the exemplifying embodiment depicted, each heating device 4 is made up of two heating surfaces 4', 4" oriented at right angles to one another. Heating surface 4" is oriented vertically, and heats sheath 17 in the region of the relevant outer surface of pallet 2. The other heating surface 4' is oriented horizontally, and heats sheath 17 in that edge region of the lower side of pallet 2 which is contiguous to the outer surface.

Figure 3:
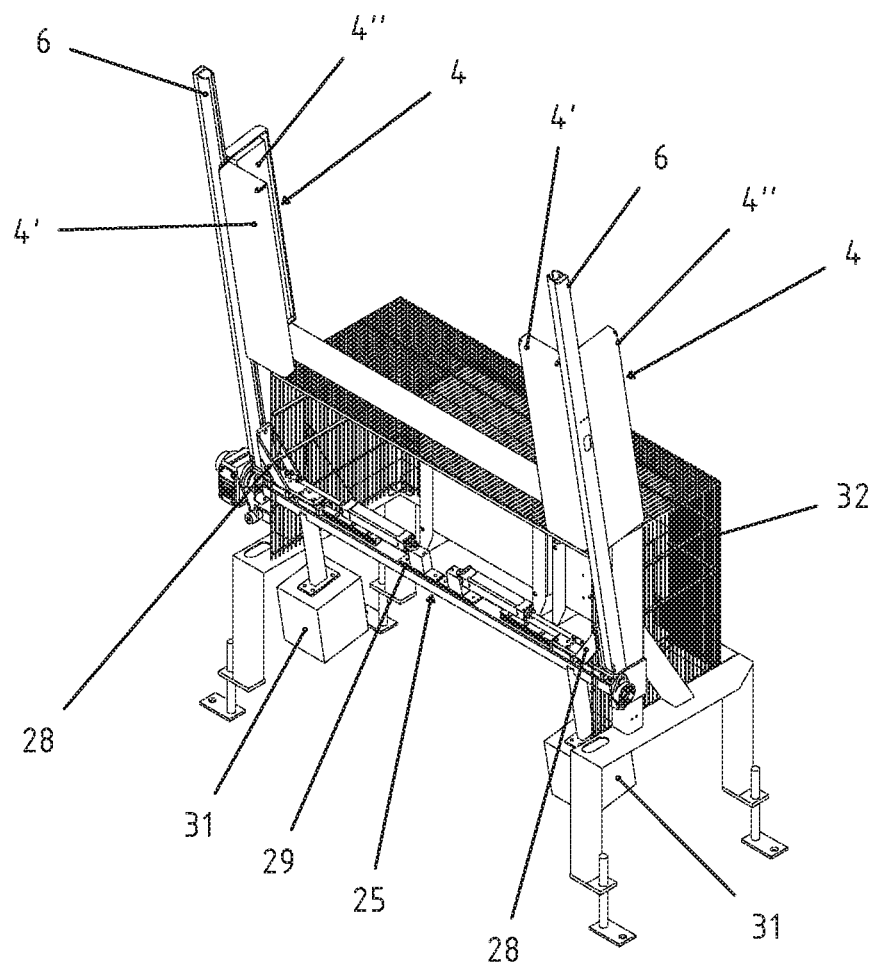
FIG. 3 shows the subject matter of FIG. 1 without a conveyor and without a pallet, the two heating devices being pivoted upward.
Figure 4:
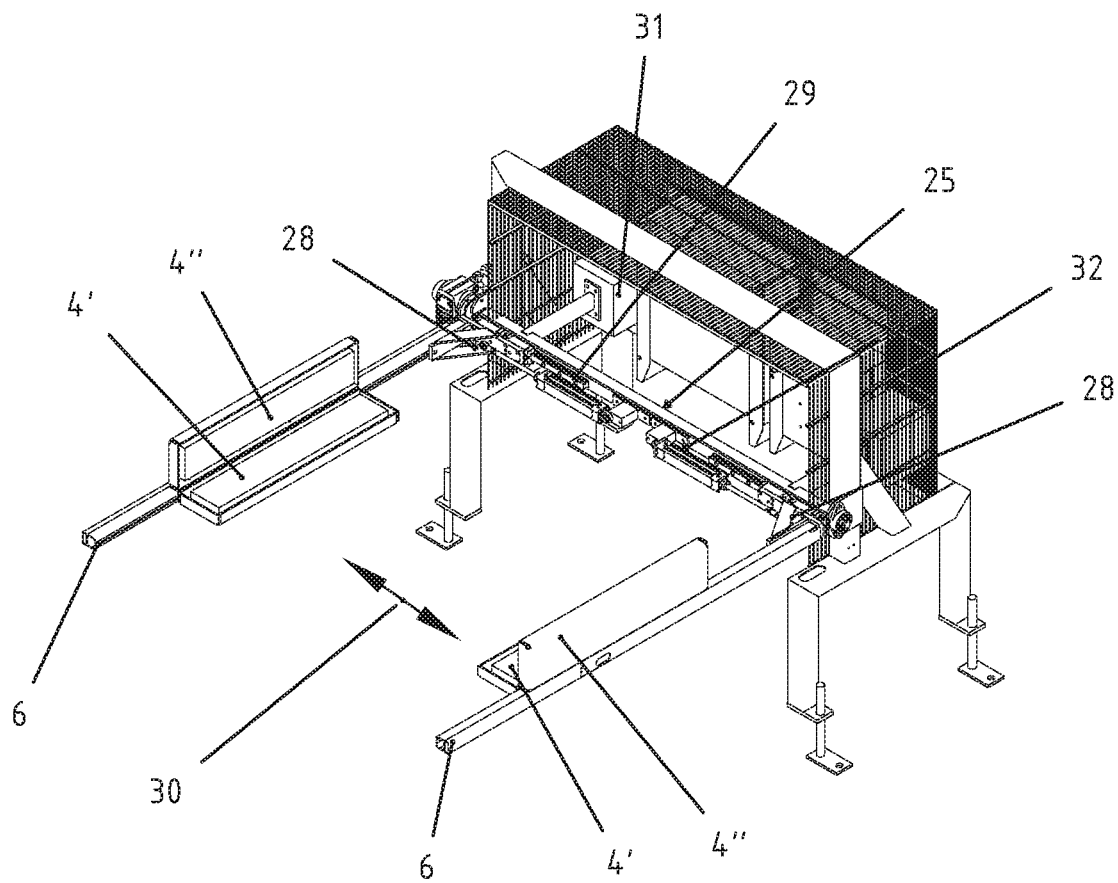
FIG. 4 shows the subject matter of FIG. 3, with the heating devices pivoted downward.
Figure 5:
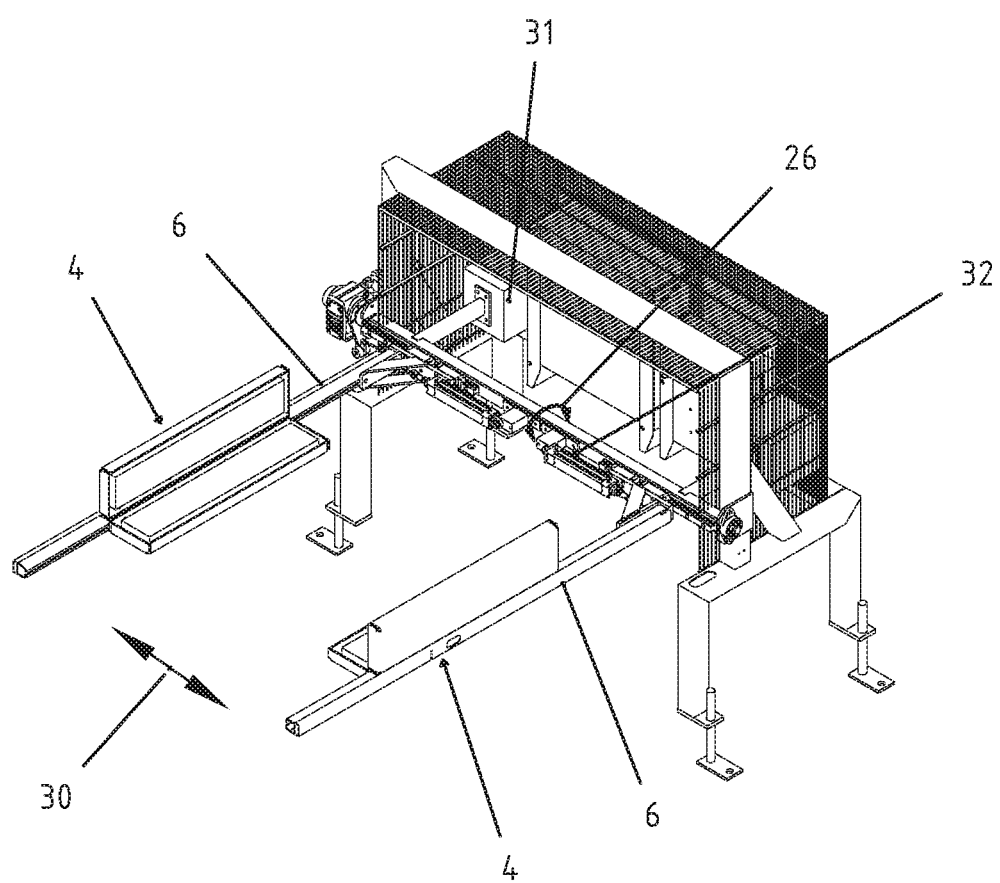
FIG. 5 shows the subject matter of FIG. 4, the distance between the heating devices being reduced.

Both heating devices 4 are displaceable by pivoting between a heating position as depicted e.g. in FIG. 1 and a parked position as depicted e.g. in FIG. 3. Each heating device 4 is arranged for this purpose on a holding arm 6. Holding arms 6 are connected to one another via a connecting element 25. The two holding arms 6 and connecting element 25 form a frame of approximately U-shaped configuration.

As is evident from FIGS. 1 to 5, connecting element 25 is mounted rotatably around its longitudinal axis (arrow 26). Heating devices 4 can thereby be pivoted upward into their parked position, for example, when a goods stack (or stack of goods) is transported in. When the goods stack is located between heating devices 4, they can be pivoted downward into their heating position as depicted, for example, in FIG. 1.

Upon downward pivoting, the distance between the two heating devices 4 is at least somewhat greater than the distance between the two oppositely located outer surfaces of pallet 2 into which at least one opening is respectively to be introduced. The "distance" between the two heating devices 4 is understood as the distance between those points on the two heating devices 4 which are located closest to one another.

In the exemplifying embodiment depicted, the distance between heating devices 4 can be modified. Each holding arm 6 has for this purpose, in the region of its end facing toward connecting element 25, a carriage 28 that is movable in a guide 29 that is associated with connecting element 25. A dedicated drive system can be associated with each holding arm 6, or a common drive system can be associated with both holding arms 6. Holding arms 6, and thus heating devices 4 as well, are thus displaceable in the direction of arrow 30. Each heating device 4 can thus be moved with its horizontally oriented heating surface 4' beneath pallet 2, i.e. into the position depicted in FIG. 1.

In order to facilitate the pivoting movement in the direction of arrow 26, each holding arm 6 comprises a counterweight 31 on its end located oppositely from heating device 4. A drive system (not depicted in further detail) is provided for the pivoting movement in the direction of arrow 26. The drive system is connected via a transfer mechanism (not depicted) to connecting element 25. The region of counterweights 31 is protected by a protective grid 32.

A total of two shaping apparatuses 7 are also provided. As is evident in particular from FIGS. 6 and 7, each side of pallet 2 oriented orthogonally to conveying direction 3 has a shaping apparatus 7 associated with it. The one shaping apparatus 7 thus acts on the one side of pallet 2 oriented orthogonally to conveying direction 3, and the other shaping apparatus 7 acts on the other, oppositely located, side of pallet 2 oriented orthogonally to conveying direction 3. Each shaping apparatus 7 is made up of two halves, the one half being arranged in the region between the one outer chain track 1 and the center chain track 1, and the other half being arranged in the region between the center chain track 1 and the other outer chain track 1. The two halves of shaping apparatus 7 acting on one side of pallet 2 are constructed in mirror-image fashion with respect to one another.

FIGS. 6 and 7 show a shaping apparatus 7 in detail. Each shaping apparatus 7 comprises a guide 8 and a drive system (not depicted). Each shaping apparatus 7 can thereby be displaced from both sides, viewed in conveying direction 3, toward pallet 2 and away again. Guide 8 is arranged parallel to and below the center chain track 1. In the exemplifying embodiment depicted, guide 8 is embodied as a ball rail guide. Other configurations are, however, also possible. It is also conceivable for each of the two shaping apparatuses 7 to have a dedicated guide 8 associated with it. Shaping apparatus 7 interacting with the one side, oriented orthogonally to conveying direction 3, of pallet 2 can then be displaced separately from shaping apparatus 7 interacting with the other side, oriented orthogonally to conveying direction 3, of pallet 2. A vertical guide having a drive system is provided for vertical lifting (arrow 9) for the shaping operation and for subsequent lowering after the shaping operation; in the exemplifying embodiment depicted, this encompasses a cylinder 10. The upper part of shaping apparatus 7 is vertically displaceable by means of cylinder 10. In the exemplifying embodiment depicted, the vertical guide is embodied as a ball rail guide and is arranged alongside cylinder 10.

Each shaping apparatus 7 possesses an angle compensation element 11 in order to compensate for angular deviations in the orientation of pallet 2. Angle compensation element 11 is a vertically oriented peg on which shaping apparatus 7 is arranged in rotatably mounted fashion. By means of a spring, shaping apparatus 7 is held in the position that corresponds to an optimum orientation of pallet 2 on chain tracks 1. In the optimum orientation, the lateral edges of pallet 2 are respectively oriented orthogonally and parallel to conveying tracks 1.

If pallet 2 happens not to have been optimally placed onto chain tracks 1, the orientation of pallet 2 upon lifting with lifting posts 5 as a rule is maintained. Any angular error would thus also continue to exist. When shaping apparatus 7 is brought against pallet 2, shaping apparatus 7 automatically orients itself with respect to pallet 2. If pallet 2 is not optimally oriented with respect to chain tracks 1, then upon contact with pallet 2, shaping apparatus 7 is rotated by pallet 2, against the force of the spring, into the position that corresponds to the orientation of pallet 2.

In the exemplifying embodiment depicted, pallet 2 also rests on the center chain track 1. Pallet 2 must therefore be lifted in order for the method to be carried out, so that for subsequent execution of the method according to the present invention, sheath 17 is no longer captured in the region of the two outer ends of runner board 22 that connects support feet 20.

If pallet 2 is not resting in the center, however, i.e. in the region of the two outer ends of runner board 22 that connects support feet 20, so that sheath 17 is therefore not captured in the region of the two outer ends of runner board 22 that connects support feet 20, it is not obligatorily necessary to lift pallet 2.

The shaping apparatuses 7, described in detail below, are provided in order to introduce the openings into sheath 17. In the idle state, as depicted in FIGS. 8A and 8B, each shaping apparatus 7 is lowered within the conveyor below the conveying level. In the exemplifying embodiment depicted, each half of a shaping apparatus 7 encompasses three upwardly pointing shaping fingers 12 and 12.1, the respective end of which is embodied as a tab and/or as a hook 24, 24.1. As will be described below, by means of the tabs and/or hooks 24, 24.1, sheath 17 can be grasped, retracted, shaped, and additionally, in particular during solidification of the still-warm sheath 17 by cooling, pressed laterally against pallet 2, as depicted in FIGS. 12A and 12B. The contact regions of shaping fingers 12 and 12.1 can be coated or equipped, at least in the regions coming into contact with sheath 17 and/or with sheath region 18, with an anti-adhesion material and/or heat-resistant material 27.

As is evident in particular from FIGS. 9, 10, and 13, the anti-adhesion material and/or heat-resistant material 27 extends at least in the region of that surface of each hook 24.1 which faces toward and away from pallet 2, and in the region of that lateral surface of each shaping finger 12.1 which, in the position depicted in FIGS. 9, 10 and 13, faces upward. It is nevertheless also entirely possible for the anti-adhesion material and/or heat-resistant material 27 also to extend at least in the region of that surface of each hook 24 which faces away from pallet 2, and in the region of that lateral surface of each shaping finger 12 which, in the position depicted in FIGS. 9 and 10, faces upward.

Each half of shaping apparatus 7 comprises two shaping fingers 12 that are displaceable in a horizontal direction away from pallet 2 in order to retract sheath region 18. The third shaping finger of each half, namely shaping finger 12.1, is pivotably mounted, for example as is evident from FIGS. 7 and 13. A drive system 13 is associated with shaping finger 12.1 for this purpose, so that shaping finger 12.1 is displaceable around pivot shaft 14. As is apparent from FIGS. 6 and 7, shaping finger 12.1 is embodied, with respect to the two shaping fingers 12 that are associated with that shaping finger 12.1, in such a way that that shaping finger 12.1 is not in contact with sheath region 18 upon retraction.

A stop 15, which enables automatic fitting into the corners of foot openings 16 of pallet 2 regardless of the format of pallet 2, is associated with each movable shaping finger 12.1. During the pivoting movement, stop 15 projects into the contour of pallet 2, i.e. into foot opening 16. When stop 15 comes into contact with the support foot of foot opening 16 upon pivoting of shaping finger 12.1, the pivoting movement is stopped.

The outline of sheath 17 and of sheath region 18 is indicated in FIGS. 8 to 13 with dashed lines. "Sheath region 18" is understood as that region of sheath 17 which, in the absence of execution of the method according to the present invention, is located in front of that foot opening 16 of pallet 2 which is intended to be made accessible through an opening in sheath 17. In the interest of clearer illustration, the goods stack arranged on pallet 2 is not depicted. The vertical extent of sheath 17 above pallet 2 is therefore merely indicated. The conveyor is also not depicted.

FIGS. 8 to 13 depict a pallet 2 that comprises three rows each made up of three block-like support feet 19, 20, 21, the three support feet 19 and 20 and 21 being connected to one another in a row, on the lower side, by a runner board 22. Sheath 17 thus engages around the lower side of the two outermost runner boards 22 and the two outer ends of runner board 22 that connects support feet 20. On the upper side, pallet 2 has a deck surface 23 that is made up of five deckboards. Transverse boards can also be arranged between support feet 19, 20, 21 and deck surface 23. In the interest of clarity, the above-described constituents of pallet 2 are labeled only in FIGS. 8 and 12.

In the exemplifying embodiment depicted in FIGS. 8 to 13, the two support feet are the outermost support feet 19, 21. Sheath region 18 that is to be displaced upward thus extends above the center support foot 20 so that as a result, both foot opening 16 between the two support feet 19, 20 and foot opening 16 between the two support feet 20, 21 are completely free of sheath region 18 after the method according to the present invention is carried out.

As already described above, each shaping apparatus 7 is made up of two halves, each half being associated with one foot opening 16 and comprising the above-described two shaping fingers 12 and shaping finger 12.1 for creation of an opening. In FIGS. 8 to 13, the respective left half represents a view toward the short side of pallet 2 (viewed in conveying direction 3), and the right half a view toward the long side of pallet 2 (parallel to conveying direction 3).

Firstly, a sheath 17 made of stretch film is pulled over in a preceding hood pull-over unit. The encased pallet 2 is then conveyed by means of the conveyor to the device according to the present invention. Once pallet 2 is located between heating devices 4, they can be pivoted down.

In the exemplifying embodiment depicted in the Figures, pallet 2 also rests on the center chain track 1. Execution of the method requires that pellet 2 be lifted by means of the pallet lifting device, which possesses lifting posts 5. This lifting is necessary on the one hand so that for subsequent execution of the method according to the present invention, sheath 17 is no longer captured in the region of the two outer ends of runner board 22 that connects support feet 20. On the other hand, heating devices 4 can now be moved toward one another, by a displacement of holding arms 6, in such a way that each heating device 4 is moved with its horizontally oriented heating surface 4' beneath pallet 2, i.e. into the position depicted in FIG. 1.

Each heating device 4 now heats sheath 17 in the region of sheath region 18. Heating surface 4" heats sheath 17 in the region of the relevant outer surface of pallet 2, while second heating surface 4' applies heat to sheath 17 in the edge region, contiguous to the outer surface, of the lower side of pallet 2.

Once sheath region 18 has been sufficiently heated, holding arms 6 having heating devices 4 can be moved back outward and then pivoted upward. The two shaping apparatuses 7 are located outside the heating region in their idle position during heating, as depicted in FIGS. 8A and 8B.

As soon as holding arms 6 have been sufficiently pivoted upward, shaping apparatuses 7 can then be moved onto pallet 2 from both sides. This is accomplished on the one hand by way of a horizontal movement (arrow 3). Shaping apparatuses 7 are also lifted in the direction of arrow 9. This is depicted in FIGS. 9A and 9B. In the context of the horizontal displacement, shaping fingers 12, 12.1 are still located below the plane of runner boards 22 of pallet 2, so that shaping fingers 12, 12.1 can be moved inside the contour of sheath 17.

Figure 10B:
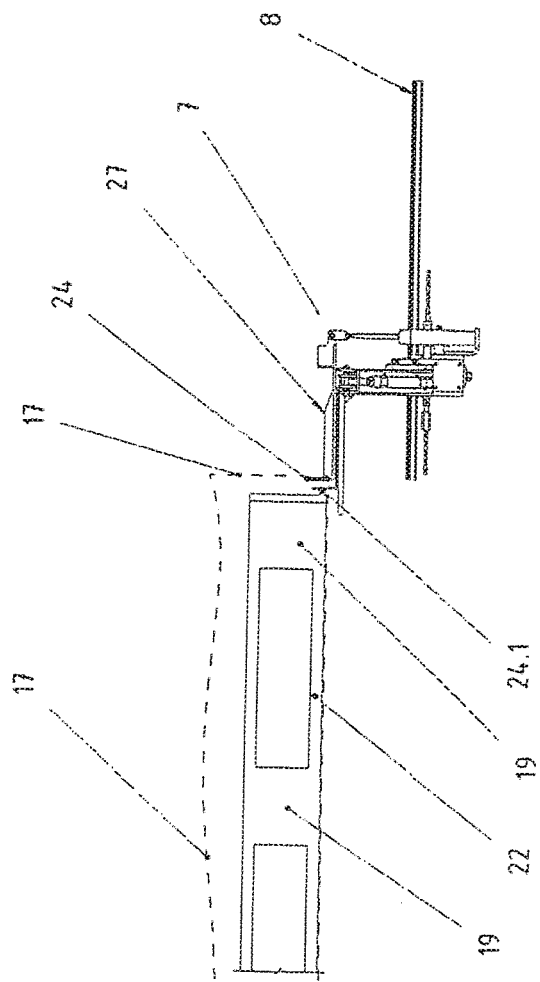
FIG. 10B shows a side view of the shaping apparatus retracted away from the pallet.
Figure 10A:
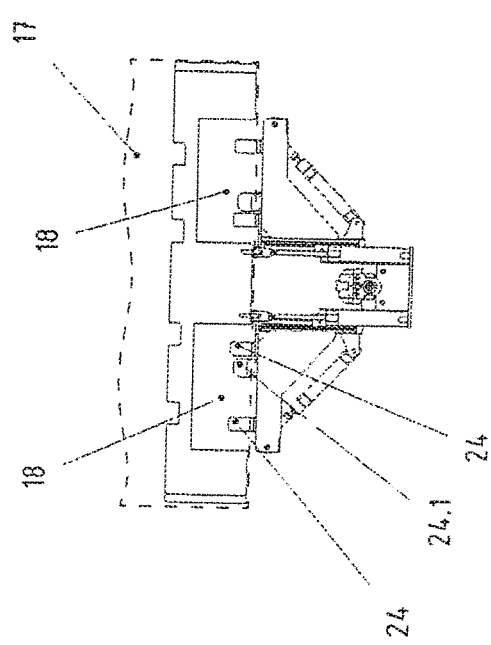
FIG. 10A shows a front view of the shaping apparatus retracted away from the pallet.

In FIGS. 10A and 10B, shaping fingers 12, 12.1 have already been lifted sufficiently that hooks 24, 24.1 are located above the lower rim of sheath 17 and thus inside sheath 17, so that hooks 24, 24.1 of shaping fingers 12, 12.1 engage behind sheath 17, which is still hot and soft from being heated. Shaping apparatus 7 and thus shaping fingers 12, 12.1 are then moved away from pallet 2 by way of the drive system associated with guide 8, so that as a result, sheath region 18 grasped by hooks 24, 24.1, still in the heated state, is retracted away from pallet 2. This is depicted in FIGS. 10A and 10B.

Figure 11A:
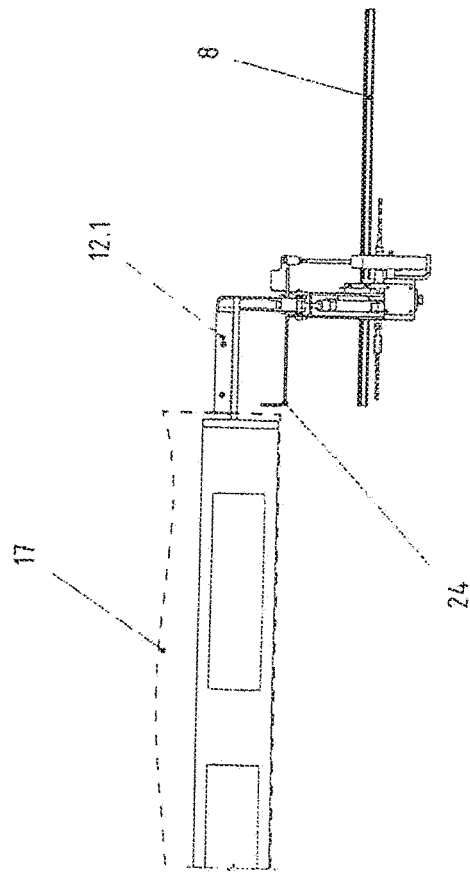
FIG. 11A shows a front view of a sheath region displaced upward.
Figure 11B:
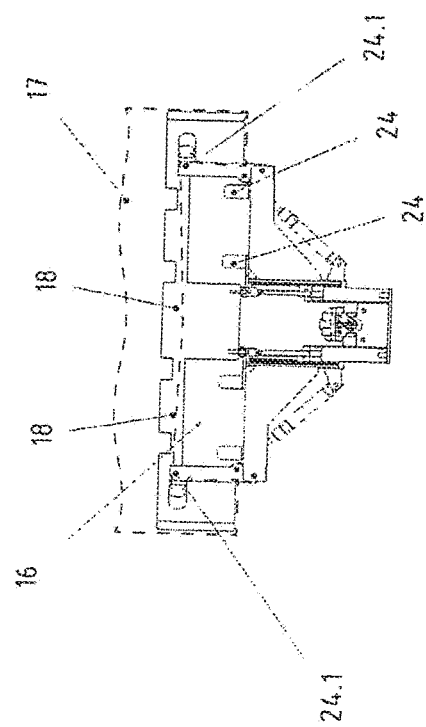
FIG. 11B shows a side view of the sheath region displaced upward.

The sheath region 18, still in the heated state, is then displaced upward. This is depicted in FIGS. 11A and 11B. For this, the shaping fingers 12.1 having hooks 24.1 are pivoted upward and outward in a pivoting movement around their pivot shaft. In the exemplifying embodiment depicted, sheath 17 is thereby pulled around the respective lower inner edge of the two support feet 19, 21, i.e. around the lower right inner edge of support foot 19 and around the lower left inner edge of the support foot 21.

Sheath region 18 is pulled along and pulled up in the context of this pivoting movement, sheath region 18 being displaced outward toward the outward-facing corner of each foot opening 16. Thanks to the two upwardly pivoted shaping fingers 12.1 of shaping apparatus 7 acting on one common side of pallet 2, sheath region 18 is thereby tensioned. Stop 15 is associated with each shaping finger 24.1 in order to limit the pivoting movement. Because stop 15 projects at least with its front end into the contour of pallet 2, i.e. into foot opening 16, stop 15 comes into contact with the support foot of foot opening 16 upon pivoting of shaping finger 12.1, so that the pivoting movement is stopped upon contact.

Shaping fingers 12, 12.1, having the respectively associated tabs 24, 24.1, are in this context located outside the contour of pallet 2, i.e. at a distance from the outer side of support foot 19, 20, 21, so that the reshaped sheath region 18 is laid from outside around the relevant foot opening 16 or, in the exemplifying embodiment depicted in FIGS. 8 to 13, around the two foot openings 16. In the stretched-out state, each shaping apparatus 7 is again displaced horizontally toward that side of pallet 2 oriented orthogonally to conveying direction 3 of pallet 2. Because the two shaping fingers 12.1 of a shaping apparatus 7 are longer than the four shaping fingers 12 of that shaping apparatus 7, and thus protrude with respect to shaping fingers 12 when viewed toward pallet 2, as a consequence of the horizontal motion shaping fingers 12.1 come into contact, with their surface of hooks 24.1 facing toward pallet 2, with deck surface 23 and with the outer side of support foot 19, 20, 21 present in the displacement path. That surface of each hook 24.1 which faces toward pallet 2, inter alia, is preferably coated for this purpose with the anti-adhesion material and/or heat-resistant material 27, as described previously with reference to FIGS. 9 and 10.

The double-ply sheath 17, not yet cooled, is pressed by hooks 24.1 against deck surface 23 and against the outer side of support foot 19, 20, 21, as depicted in FIGS. 12A and 12B. As a consequence of the horizontal movement, the stretched-out sheath region 18 and the contiguous sheath 17 are displaced back closer to pallet 2 and, upon cooling and before they harden, attach to sheath 17 laid around support feet 19, 20, 21 so that additional stabilization is thereby achieved by way of the attached sheath region 18 along with the contiguous sheath 17 and/or pallet 2. Angle compensation element 11 acts in the context of this pressure application operation.

Sheath region 18 then solidifies in the stretched-out position upon cooling. As a consequence thereof, the relevant foot opening 16 is permanently entirely free of sheath region 18. As a result of the stretching out, foot openings 16 below pallet 2 are completely exposed. In the exemplifying embodiment depicted, there is also no longer any sheath 17 in the region of the two outer ends of runner board 22 that connects support feet 20.

If sheath 17 is additionally, upon outward retraction of sheath region 18 and/or upon upward displacement of sheath region 18, to be secured at the two sides (outer surfaces) to be shaped, which in the exemplifying embodiment depicted are the short end faces of pallet 2, then for example a securing element of pin-like configuration (not depicted), displaceable toward pallet 2, can be provided. Sheath 17 can be pressed against pallet 2 by means of the securing element. This end-face securing prevents undesired "half-moon" formation.

In the exemplifying embodiment depicted, the center chain track 1 is made up of two chains extending in parallel at a distance from one another. A corresponding securing element can be located between the two chains of the center chain track 1. The securing element then acts at the center of pallet 2 approximately at the height of deck surface 23 or somewhat lower. The securing element can be displaced, for example by a pivoting movement, from its idle position, in which it does not project out of the plane of the chain conveyer, into its securing position. The pivot shaft and the associated drive system of a correspondingly embodied securing element can be a constituent of the conveyor. It is also entirely possible, however, for the pivot shaft and the associated drive system of the securing element to be a constituent of shaping apparatus 7.

The securing element can also, for example, be located laterally at a short distance from the center chain track 1. It then does not act exactly on the center of pallet 2 if the pivot plane of the securing element is parallel to the axis of chain track 1 and of conveying direction 3. If the pivot plane of the securing element is not parallel to the axis of chain track 1 and of conveying direction 3, however, contact at the center of pallet 2 is possible in that case as well. Regardless of the orientation of the pivot plane of the securing element, the securing element acts on pallet 2 approximately at the height of deck surface 23 or slightly lower.

It is of course also possible for a respective securing element to be located on each side of the center chain track 1, so that sheath 17 is thereby pressed against pallet 2 at two locations.

Figures 13A, 13B:
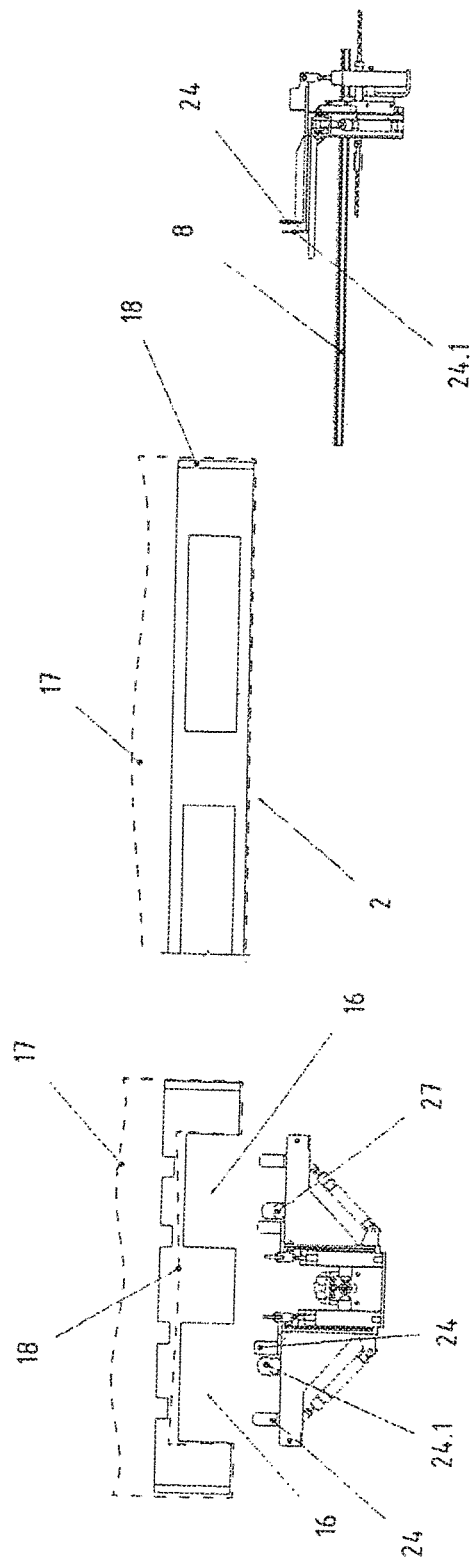
FIG. 13A shows a front view of the sheath in the shaped state.
FIG. 13B shows a side view of the sheath in the shaped state.

Once the relevant foot opening 16 has been rendered permanently completely free of sheath region 18, shaping fingers 12.1 are pivoted back downward. This situation is depicted in FIGS. 13A and 13B. As is evident from FIGS. 13A and 13B, as depicted here the shaping apparatuses 7 have already been lowered again and moved outward.

It is of course also possible for only one shaping apparatus 7 to be provided, so that an opening can thus be introduced into sheath 17 only on one side. In this case only one heating device is also necessary.

The invention claimed is:

1. A method for creating at least one opening in a sheath (17), made of stretch film, that retains a goods stack arranged on a pallet (2), the method comprising: providing a pallet, the pallet (2) comprising an upper-side deck surface (23) as support for the goods stack and several lower-side support feet (19, 20, 21) arranged at a distance from one another and forming foot openings (16), and the sheath (17) engaging at least partly under the lower side of the support feet (19, 20, 21) arranged in a region of four outer edges of the pallet (2), and at least one opening being introduced into a sheath region (18) located between two support feet (19 or 20 or 21) that are arranged in a row having at least two support feet (19, 20, 21), wherein at least one opening is generated in such a way that the sheath region (18) is firstly heated; then the heated sheath region (18) is retracted from the pallet (2) and then, still in a heated state, displaced upward, the upwardly displaced sheath region (18) then being secured in an upwardly displaced position thereof by cooling, and wherein the heated sheath region (18) is retracted from the pallet (2) only when heating of the sheath region (18) is entirely completed.

2. The method according to claim 1, wherein the pallet (2) is lifted before the sheath region (18) is heated.

3. The method according to claim 1, wherein the upward displacement occurs as far as the deck surface (23).

4. The method according to claim 1, wherein upon the upward displacement of the sheath region (18), the sheath (17) is pulled around the respective lower inner edge of the two support feet (19 or 20 or 21).

5. The method according to claim 1, wherein the two support feet (19, 20, 21) are directly adjacent or are outermost support feet of a row.

6. The method according to claim 1, wherein the sheath (17) is secured on the lower side of the two support feet (19, 20, 21) before and/or after the sheath region (18) is retracted from the pallet (2), and/or before and/or after the upward displacement of the sheath region (18).

7. The method according to claim 1, wherein the retraction and/or upward displacement of the sheath region (18) from the pallet (2) occurs in such a way that the sheath (17) still remains secured on the lower side of the two support feet (19, 20, 21).

8. The method according to claim 1, wherein a stretch hood or stretch tube is used as a sheath (17).

9. The method according to claim 1, wherein during retraction and/or upward displacement of the sheath region (18), at least a sub-region of the sheath (17) is at least temporarily secured with respect to the pallet (2) from outside in a horizontal direction.

10. The method according to claim 1, wherein at least the upwardly displaced sheath region (18) that is still in the heated state is displaced back toward the pallet (2) before cooling.

11. The method according to claim 10, wherein the displacement back toward the pallet (2) at least of the upwardly displaced sheath region (18) that is still in the heated state occurs, before cooling, sufficiently far toward the pallet (2) that the stretched-out sheath region (18) and/or the respective sub-regions of the sheath (17) laterally contiguous to the sheath region (18) is/are at least somewhat pressed on the rear side against at least one support foot (19, 20, 21) and/or against the deck surface (23) of the pallet (2).

12. The method according to claim 1, wherein the heated sheath region (18) is cooled after completion of the upward displacement.

13. The method according to claim 1, including the step of at least temporarily securing during retraction and/or upward displacement of the sheath region (18), at least a sub-region of the sheath (17) to the pallet (2) from outside in a horizontal direction.

14. The method according to claim 13, including the step of temporarily securing at least the sub-region of the sheath (17) to the pallet (2) by pressure application, in at least one region close to a foot opening (16) of the pallet above the sheath region (18).

15. A method for creating at least one opening in a sheath (17) that retains a stack of goods arranged on a pallet (2), the method comprising the steps of:
- providing a stack of goods on a pallet;
- providing a sheath made of a stretch film;
- positioning the sheath over the stack and the pallet;
- heating a sheath region (18) of the sheath;
- retracting the heated sheath region (18) from the pallet (2) after the heating of the sheath region (18) is completed;
- displacing the sheath region (18) upward about the pallet while the sheath region is still in a heated state; and
- cooling the upwardly displaced sheath region (18) in the upwardly displaced position and thereby securing the sheath to the pallet and stack.

16. The method according to claim 15, further comprising the step of lifting the pallet (2) before the step of heating the sheath region (18).

17. The method according to claim 15, wherein the upward displacement occurs as far as an upper-side deck surface (23) of the pallet, and wherein the upper-side deck surface (23) is configured for supporting the stack of goods.

18. The method according to claim 15, wherein the pallet (2) comprises an upper-side deck surface (23) and lower-side support feet (19, 20, 21) arranged at a distance from one another and forming foot openings (16), and wherein, upon the upward displacement of the sheath region (18), the sheath (17) is pulled around a respective lower inner edge of the two support feet (19 or 20 or 21).

19. The method according to claim 15, wherein the pallet (2) comprises an upper-side deck surface (23) and lower-side support feet (19, 20, 21) arranged at a distance from one another and forming foot openings (16), and wherein the two support feet (19, 20, 21) are directly adjacent or are outermost support feet of a row.

20. The method according to claim 15, wherein the pallet (2) comprises an upper-side deck surface (23) and lower-side support feet (19, 20, 21) arranged at a distance from one another and forming foot openings (16), and wherein the sheath (17) is secured on lower sides of the two support feet (19, 20, 21) before and/or after the sheath region (18) is retracted from the pallet (2), and/or before and/or after the upward displacement of the sheath region (18).

21. The method according to claim 15, wherein the pallet (2) comprises an upper-side deck surface (23) and lower-side support feet (19, 20, 21) arranged at a distance from one another and forming foot openings (16), and wherein the retraction and/or upward displacement of the sheath region (18) from the pallet (2) occurs in such a way that the sheath (17) still remains secured on lower sides of the two support feet (19, 20, 21).

22. The method according to claim 15, including the step of providing a stretch hood or stretch tube as the sheath (17).

23. The method according to claim 15, including the step of displacing the upwardly displaced sheath region (18) back toward the pallet (2) before cooling.

24. The method according to claim 23, wherein the displacement toward the pallet (2) of the upwardly displaced sheath region (18) that is still in the heated state occurs, before cooling, sufficiently far toward the pallet (2) that the stretched-out sheath region (18) and/or the respective sub-regions of the sheath (17) laterally contiguous to the sheath region (18) is/are at least somewhat pressed on the rear side against at least one support foot (19, 20, 21) and/or against the deck surface (23) of the pallet (2).

25. The method according to claim 15, wherein the step of cooling the upwardly displaced heated sheath region (18) is carried out after completion of the upward displacement of the sheath.

26. The method according to claim 25, wherein the step of cooling the heated sheath region (18) is performed by an air stream.

* * * * *